US012695574B2

(12) United States Patent

He

(10) Patent No.: US 12,695,574 B2

(45) Date of Patent: Jul. 28, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 316 days.

(21) Appl. No.: 18/215,620

(22) Filed: Jun. 28, 2023

(65) Prior Publication Data

US 2023/0344601 A1 Oct. 26, 2023

Related U.S. Application Data

(63) Continuation of application No. PCT/CN2020/141058, filed on Dec. 29, 2020.

(51) Int. Cl.
*H04L 5/00* (2006.01)
*H04W 72/232* (2023.01)

(52) U.S. Cl.
CPC ......... *H04L 5/0053* (2013.01); *H04W 72/232* (2023.01)

(58) Field of Classification Search
CPC ... H04L 5/0053; H04L 5/0092; H04L 5/0007; H04W 72/232
See application file for complete search history.

(56) References Cited

U.S. PATENT DOCUMENTS

| | | | | |
|---|---|---|---|---|
| 2020/0036497 A1* | 1/2020 | Xu | ......................... | H04W 72/23 |
| 2020/0221462 A1* | 7/2020 | Tang | ..................... | H04W 72/53 |
| 2021/0160827 A1* | 5/2021 | Kim | ...................... | H04L 5/0053 |
| 2021/0289536 A1* | 9/2021 | Liu | ......................... | H04L 5/0091 |
| 2021/0360667 A1* | 11/2021 | Moon | ................... | H04L 5/0035 |

FOREIGN PATENT DOCUMENTS

| | | |
|---|---|---|
| CN | 108401533 A | 8/2018 |
| CN | 109691206 A | 4/2019 |
| CN | 109803389 A | 5/2019 |
| CN | 110784927 A | 2/2020 |
| CN | 110892770 A | 3/2020 |
| CN | 111162887 A | 5/2020 |
| WO | 2018184470 A1 | 10/2018 |

OTHER PUBLICATIONS

Priority Review issued in corresponding Chinese application No. 202310415364.5, mailed Jun. 28, 2024.

(Continued)

*Primary Examiner* — Dady Chery

(74) *Attorney, Agent, or Firm* — BAYES PLLC

(57) ABSTRACT

The embodiments of the present disclosure provide a wireless communication method, a terminal device, and a network device. The method comprises: obtaining configuration information of a search space of a PDCCH; and bundling, according to the configuration information, multiple symbol sets of at least one CORESET so as to achieve the enhanced coverage of the PDCCH.

8 Claims, 7 Drawing Sheets

100

(56)          References Cited

OTHER PUBLICATIONS

First Office Action issued in corresponding Chinese application No. 202310415364.5, mailed Jul. 5, 2024.
Source: Guangdong OPPO Mobile Telecom; Title: PDCCH CORESET configuration and UE procedure on NR-PDCCH monitoring; 3GPP TSG RAN WG1 NR Ad-Hoc#2 R1-1710150 Qingdao, P.R. China Jun. 27-30, 2017.
Notice of Grant of Invention Patent Right issued in corresponding Chinese Application No. 202310415364.5, datead Sep. 12, 2024, 6 pages.
International Search Report issued in international application No. PCT/CN2020/141058, mailed Sep. 17, 2021.
Written Opinion of the International Searching Authority issued in international application No. PCT/CN2020/141058, mailed Sep. 17, 2021.

3GPP TS 38.213 V15.3.0 (Sep. 2018); Technical Specification Group Radio Access Network; NR; Physical layer procedures for control (Release 15).
3GPP TS 38.331 V15.3.0 (Sep. 2018); Technical Specification Group Radio Access Network; NR; Radio Resource Control (RRC) protocol specification (Release 15).
MCC Support, "Draft Report of 3GPP TSG RAN WG1 #103-e v0.2.0 (Online meeting, Oct. 26-Nov. 13, 2020)", R1-210xxxx, 3GPP TSG RAN WG1 Meeting #104-e e-Meeting, Ja. 25-Feb. 5, 2021.
3GPP TS 38.211 V16.2.0 (Jun. 2020); Technical Specification Group Radio Access Network; NR; Physical channels and modulation (Release 16).
3GPP TS 38.331 V16.1.0 (Jul. 2020); Technical Specification Group Radio Access Network; NR; Radio Resource Control (RRC) protocol specification (Release 16).

* cited by examiner

100

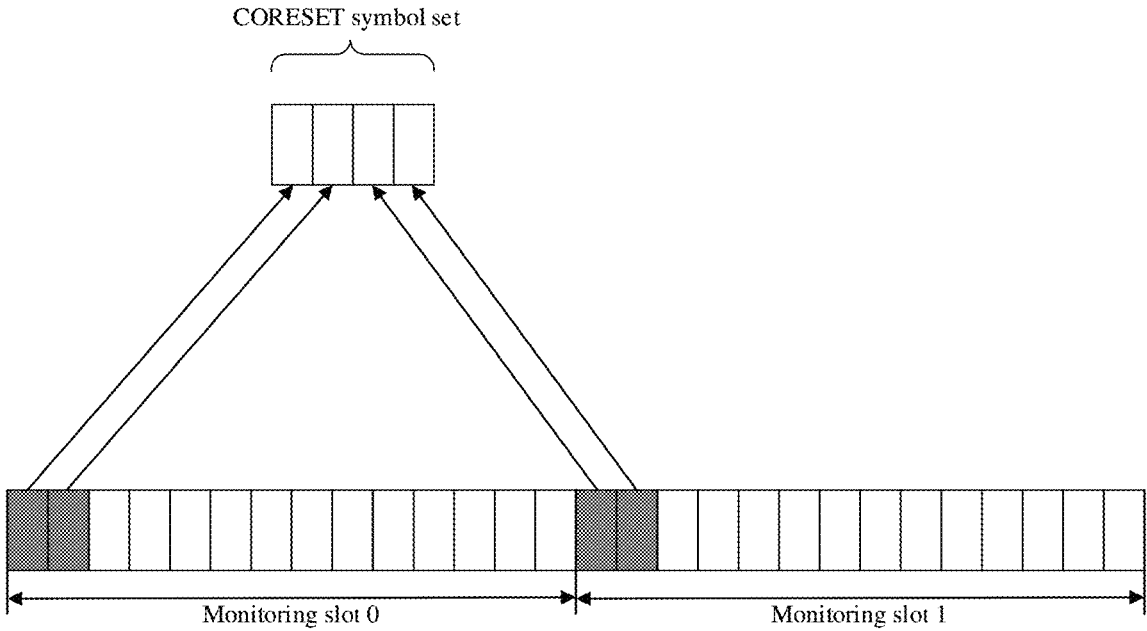
CORESET symbol set
Monitoring slot 0                 Monitoring slot 1
Monitoring symbol in
PDCCH monitoring slot
FIG.10
Terminal device 1100
Communication unit 1110
Processing unit 1120
FIG.11
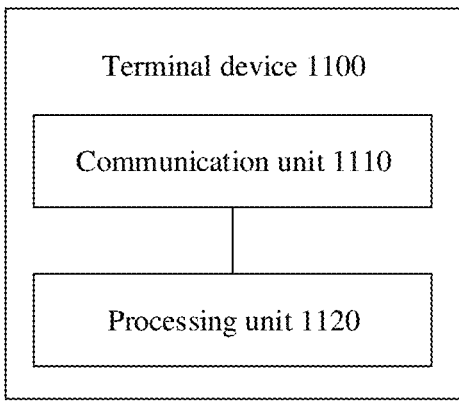
Terminal device 1200
Communication unit 1210
FIG.12

Network device 1300

Communication unit 1310

Network device 1400

Communication unit 1410

Communication device 1500

Memory 1520

Processor 1510

Transceiver 1530

Communication system 1700

Terminal device    —1710     Network device    —1720

WIRELESS COMMUNICATION METHOD, TERMINAL DEVICE, AND NETWORK DEVICE

CROSS-REFERENCE TO RELATED APPLICATION

This application is a continuation of International Patent Application No. PCT/CN2020/141058, entitled "WIRELESS COMMUNICATION METHOD, TERMINAL DEVICE, AND NETWORK DEVICE", filed on Dec. 29, 2020, the disclosure of which is incorporated herein by reference in its entirety.

TECHNICAL FIELD

The embodiments of the present disclosure relate to the communication field, and in particular to a wireless communication method, a terminal device, and a network device.

BACKGROUND

For a Reduced capability (RedCap) terminal, due to reduction of bandwidth and the number of antennas, there will be a certain performance loss in reception of downlink channels, including reception loss of a Physical Downlink Control Channel (PDCCH).

SUMMARY

The embodiment of the present disclosure provides a wireless communication method, a terminal device and a network device.

In a first aspect, a wireless communication method is provided, including: obtaining configuration information of a search space of a PDCCH; and bundling multiple symbol sets of at least one CORESET according to the configuration information.

In a second aspect, a wireless communication method is provided, including: obtaining indication information; wherein the indication information is used to indicate a symbol set of a CORESET, and the symbol set includes discontinuous symbols.

In a third aspect, a wireless communication method is provided, including: sending configuration information of a search space of a PDCCH to a terminal device; wherein the configuration information is used to bundle multiple symbol sets of at least one CORESET.

In a fourth aspect, a wireless communication method is provided, including: sending indication information to a terminal device; wherein the indication information is used to indicate a symbol set of a CORESET, and the symbol set includes discontinuous symbols.

In a fifth aspect, there is provided a terminal device which is configured to perform the methods in the first aspect, the second aspect or the implementations thereof as described above.

Specifically, the terminal device includes functional modules configured to perform the methods in the above first aspect, second aspect or the implementations thereof.

In a sixth aspect, a network device is provided, configured to perform the methods in the above third aspect, fourth aspect, or the implementations thereof.

Specifically, the network device includes functional modules configured to perform the methods in the above third aspect, fourth aspect or the implementations thereof.

In a seventh aspect, there is provided a terminal device including a processor and a memory. The memory is used for storing a computer program, and the processor is configured to call and run the computer program stored in the memory to perform the method in the above first aspect, second aspect, or the implementations thereof.

In an eighth aspect, there is provided a network device including a processor and a memory. The memory is used for storing a computer program, and the processor is configured to call and run the computer program stored in the memory to perform the method in the above third aspect, fourth aspect or the implementations thereof.

In a ninth aspect, an apparatus is provided, which is configured to carry out the method in the foregoing first aspect or the implementations thereof.

Specifically, the apparatus includes a processor configured to call and run a computer program from a memory, to cause a device installed with the apparatus to perform the method in the above first aspect, second aspect, third aspect, fourth aspect, or the implementations thereof.

In a tenth aspect, a computer program product is provided, including computer program instructions which cause a computer to perform the methods in the above first aspect, second aspect, third aspect, fourth aspect or the implementations thereof.

In a eleventh aspect, there is provided a computer program which, when running on a computer, causes the computer to perform the method in the above first aspect, second aspect, third aspect, fourth aspect or the implementations thereof.

BRIEF DESCRIPTION OF THE DRAWINGS

FIG. 10 is a schematic diagram of another distribution of a symbol set of a CORESET provided by an embodiment of the present disclosure;

FIG. 11 shows a schematic block diagram of a terminal device 1100 according to an embodiment of the present disclosure;

FIG. 12 shows a schematic block diagram of a terminal device 1200 according to an embodiment of the present disclosure;

DETAILED DESCRIPTION

The technical solutions in the embodiments of the present disclosure will be described below in connection with the drawings in the embodiments of the present disclosure. Obviously, the embodiments described are part of but not all of the embodiments of the present disclosure. All other embodiments obtained by those of ordinary skill in the art based on the embodiments in the present disclosure without creative work fall within the protection scope of the present disclosure.

The embodiments of the present disclosure can be applied to various communication systems such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio, NR system, an evolution system of a NR system, a LTE-based access to unlicensed spectrum (LTE-U) system, a NR-based access to unlicensed spectrum (NR-U) system, a Universal Mobile Telecommunication System (UMTS), Wireless Local Area Networks (WLAN), a Wireless Fidelity (WiFi), a next-generation communication system or other communication systems.

Generally speaking, traditional communication systems support a limited number of connections and are easy to implement. However, with the development of communication technologies, mobile communication systems will not only support traditional communications, but will also support, for example, Device to Device (D2D) communication, machine to machine (M2M) communication, machine type communication (MTC), vehicle to vehicle (V2V) communication, etc. The embodiments of the present disclosure can also be applied to these communication systems.

Optionally, the communication system in the embodiments of the present disclosure can be applied to a carrier aggregation (CA) scenario, a dual connectivity (DC) scenario, or a standalone (SA) deployment scenario.

The frequency spectrum applied in the embodiments of the present disclosure is not limited. For example, the embodiments of the present disclosure can be applied to licensed spectrum, and can also be applied to unlicensed spectrum.

Figure 1:
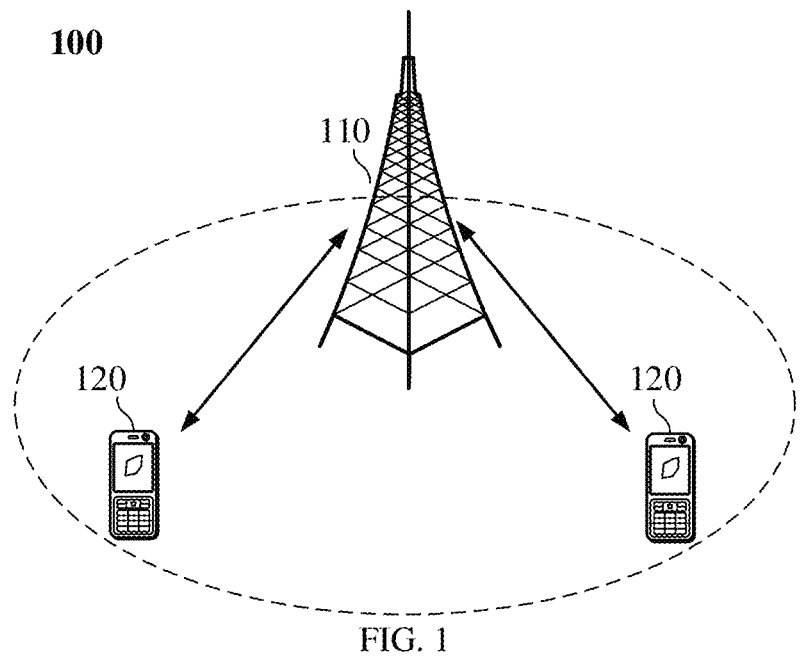
FIG. 1 is a schematic diagram of architecture of a communication system provided by an embodiment of the present disclosure.

Exemplarily, a communication system 100 to which the embodiments of the present disclosure are applied is as shown in FIG. 1. The communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area.

FIG. 1 exemplarily shows one network device and two terminal devices. Optionally, the communication system 100 may include multiple network devices and other numbers of terminal devices can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and a terminal device 120 which have the communication function. The network device 110 and the terminal device 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

Various embodiments are described in combination with the terminal device and the network device in the embodiments of the present disclosure in which the terminal device may also be referred to as user equipment (UE), an access terminal, a user unit, a user station, a mobile station, a mobile site, a remote station, a remote terminal, a mobile device, a user terminal, a terminal, a wireless communication device, a user agent or a user device. The terminal device can be a station (ST) in a WLAN, which may be a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing devices connected to wireless modems, a vehicle-mounted device, a wearable device, and a terminal device in next-generation communication system, such as a terminal device in the NR network or a terminal device in the future evolution of the Public Land Mobile Network (PLMN) network.

As an example instead of a limitation, in the embodiments of the present disclosure, the terminal device may also be a wearable device. The wearable device can also be referred to as a wearable smart device, which is a general term for wearable devices which are designed and developed by using wearable technology to intelligently design and develop everyday wear, such as glasses, gloves, watches, clothing and shoes. The wearable device is a portable device that is directly worn on the body or integrated into user's clothes or accessories. The wearable device is not only a hardware device, but also realizes powerful functions through software support, data interaction, and cloud interaction. In a broad sense, the wearable smart device includes full-featured and large-sized devices of which complete or partial functions can be achieved without relying on smart phones, such as smart watches or smart glasses, and devices which focus on only a certain type of application function and need to cooperate with other devices such as smart phones, such as various smart bracelets and smart jewelry for physical sign monitoring.

The network device can be a device used to communicate with a mobile device. The network device can be an access point (AP) in WLAN, a Base Transceiver Station (BTS) in GSM or CDMA, or a NodeB (NB) in WCDMA, and can also be an Evolutional Node B (eNB or eNodeB) in LTE, a relay station, an access point, a vehicle-mounted device, a wearable device, a network device or base station (gNB) in a NR network, a network device in future evolutional PLMN network, or the like.

In the embodiments of the present disclosure, the network device provides services for a cell, and the terminal device communicates with the network device through transmission resources (for example, frequency domain resources, or spectrum resources) used by the cell. The cell may be a cell corresponding to the network device (e.g., a cell corresponding to the base station), or belong to a macro base station or a base station corresponding to a small cell. The small cell herein can include a Metro cell, a Micro cell, a Pico cell, a Femto cell, etc., which are characterized in small coverage and low transmission power, and are suitable for providing high-rate data transmission services.

Before introducing the technical solution of the present disclosure, relevant technologies of the present disclosure are introduced below.

1. RedCap Terminal

The NR system is mainly designed to support Enhanced Mobile Broadband (eMBB) services. The main techniques thereof are used to meet the requirements of high speed, high spectral efficiency and large bandwidth. In fact, in addition to eMBB, there are many different types of services, such as sensor networks, video surveillance, wearables, etc., which have different requirements from eMBB services in terms of speed, bandwidth, power consumption, cost, etc. The capability of the terminal device supporting these services is reduced compared with the terminal device supporting eMBB. For example, the supported bandwidth is reduced, the processing time is loosened, the number of antennas is reduced, the maximum modulation order is loosened, and so on. The NR system needs to be optimized for these services and corresponding reduced-capability terminals, and such terminal devices can be referred to as RedCap terminals for short. In LTE technology, there are already similar system designs to support terminals with a large number of connections, low power consumption, and low cost, such as Machine Type Communication (MTC) and Narrow Band Internet of Things (NB-IoT). In the NR system, it is expected to introduce similar technologies to support other service types than the eMBB service. For such terminals with low complexity and low cost, an optimization method that can be adopted is coverage enhancement, so as to improve the downlink and uplink coverage for such terminals.

2. Search Space and Control Resource Set (CORESET) in NR

The PDCCH is used to carry Downlink Control Information (DCI) information. Depending on the format of the carried DCI, different control information may be indicated to the terminal device, such as downlink scheduling information, uplink scheduling information, slot format indication information, and the like.

In NR, the search space of the PDCCH indicated by the network device to the terminal device includes a common search space and a terminal device-specific search space. The terminal device detects the PDCCH according to the indicated search space.

The search space of the PDCCH is generally notified by the network device to the terminal device through Radio Resource Control (RRC) signaling. The configuration information of the search space includes the following information:

1. Search space Identity (ID): it is an index of the search space.
2. CORESET ID: the CORESET is used to configure time-frequency resources of the search space of the PDCCH.
3. The number of slots in a detection cycle of the PDCCH and an offset of a monitoring occasion within the detection cycle. Currently, the detection cycles supported by NR include 1, 2, 4, 5, 8, 10, 16, 20, 40, 80, 160, 320, 640, 1280, and 2560 slots.
3. Duration: indicating the number of continuous monitoring slots within the PDCCH detection cycle.
4. Monitoring symbols within a slot (monitoringSymbolsWithinSlot): indicating a position of the first symbol of the CORESET within the monitoring slot of the PDCCH.
5. PDCCH candidates: indicating configuration information of PDCCH candidates.
6. Type of search space: indicating whether the search space is a common search space or a terminal device-specific search space (UE-specific search space).

Figure 2:
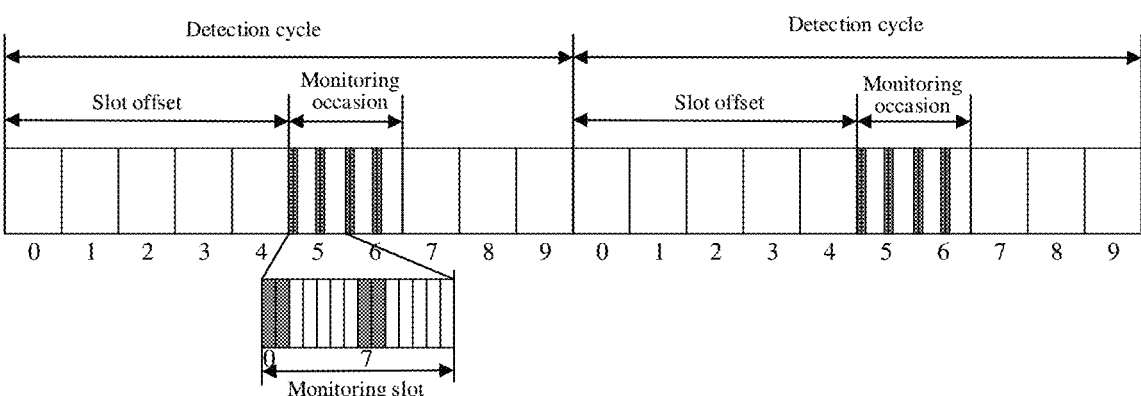
FIG. 2 is a schematic diagram of time-domain configuration information of a search space provided by an embodiment of the present disclosure.

Exemplarily, FIG. 2 is a schematic diagram of time-domain configuration information of a search space provided by an embodiment of the present disclosure. As shown in FIG. 2, a PDCCH detection cycle includes 10 slots. The offset of the monitoring occasion in the detection cycle is 5 slots. One monitoring occasion includes 2 continuous monitoring slots, and 2 symbol sets of a CORESET corresponding to the CORESET ID are monitored in one monitoring slot. Each of the symbol sets includes 2 symbols, and the positions of the first symbols of the two symbol sets are respectively symbol 0 and symbol 7 in the monitoring slot.

In NR, the configuration of the PDCCH search space includes the CORESET, and the CORESET information indicates information such as Resource Blocks (RBs) occupied in the frequency domain and the number of symbols occupied in the time domain for carrying the PDCCH. The network device can configure the CORESET through RRC signaling, and the configuration information of the CORESET includes the following information:

1. CORESET ID: its value ranges from 1 to 11, and CORESET 0 is the CORESET indicated in a broadcast message.
2. Frequency domain resources (frequencyDomainResources): that is, the frequency domain resources of the CORESET, indicating the RBs included in the CORESET.
3. Duration: the number of continuous symbols of the CORESET, and the value thereof can be {1,2,3}.
4. Parameter cce-REG-MappingType: it can be configured as interleaved mapping or non-interleaved mapping.
5. Parameter precoderGranularity: indicating whether precoder granularity of DMRS is wideband precoding or narrowband precoding.

Figure 3:
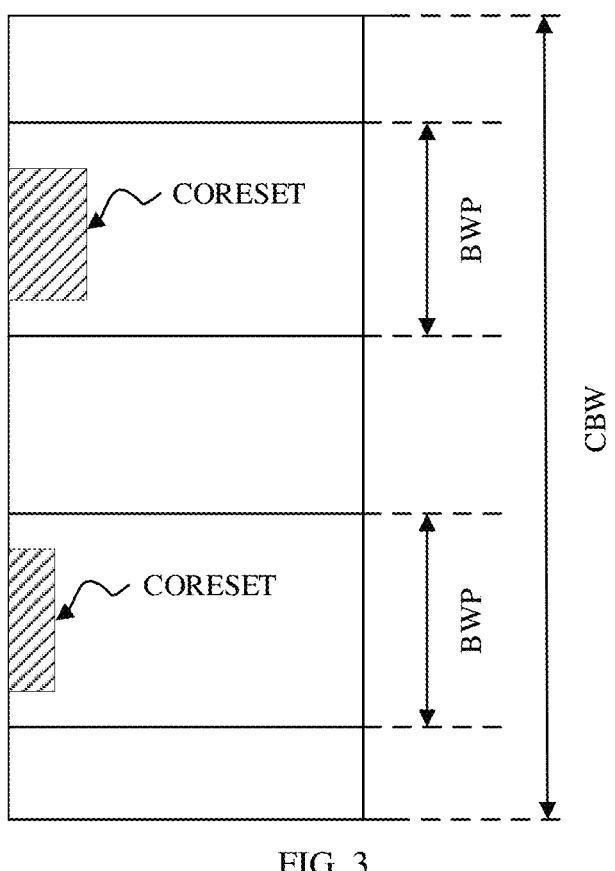
FIG. 3 is a schematic diagram of distribution of CORESETs provided by the embodiment of the present disclosure.

FIG. 3 is a schematic diagram of distribution of a CORE-SET provided by an embodiment of the present disclosure. As shown in FIG. 3, several BandWidth Parts (BWPs) can be included in a Cell Bandwidth (CBW), and each BWP can be configured with at least one CORESET. As shown in FIG. 3, one CORESET is configured for each BWP. Further, in combination with the search space configured by the network, the terminal device can detect the PDCCH in the CORESET at a corresponding monitoring occasion.

As mentioned above, for the RedCap terminal, due to the reduction of the bandwidth and the number of antennas, there is a reception loss of the PDCCH. How to realize the enhanced coverage of the PDCCH in this case is a technical problem to be solved urgently in the present disclosure.

In order to solve the above technical problem, the present disclosure adopts the method of bundling multiple symbol sets of the CORESET, or expanding the number of symbols of the CORESET, so as to realize a higher aggregation level of the PDCCH and enhanced coverage of the PDCCH.

The technical solutions of the present disclosure will be described in detail below.

Embodiment 1

Figure 4:
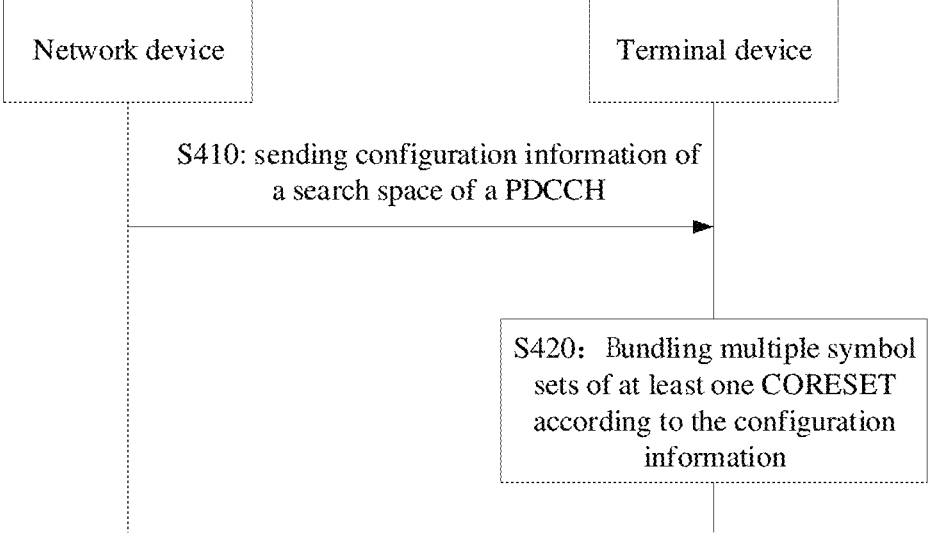
FIG. 4 is an interaction flowchart of a wireless communication method provided by an embodiment of the present disclosure.

FIG. 4 is an interactive flow chart of a wireless communication method provided in an embodiment of the present disclosure. As shown in FIG. 4, the method includes the following steps.

In S410, a network device sends configuration information of a search space of a PDCCH to a terminal device.

In S420, the terminal device bundles multiple symbol sets of at least one CORESET according to the configuration information.

It should be understood that the configuration information of the search space for the PDCCH may be the configuration information such as that introduced in section 2 of the relevant technologies. The configuration information may include IDs of one or more CORESETs.

Optionally, when the configuration information includes an ID of one CORESET, the above-mentioned multiple symbol sets are multiple symbol sets of the one CORESET. When the configuration information includes IDs of multiple CORESETs, there may be a one-to-one correspondence between the multiple symbol sets and the multiple CORE-SETs, for example: CORESET 1 corresponds to symbol set 1, and CORESET 2 corresponds to symbol set 2. There may not be a one-to-one correspondence between the multiple symbol sets and the multiple CORESETs, for example: CORESET 1 corresponds to symbol sets 1 and 2, and CORESET 2 corresponds to symbol sets 3 and 4. In a word, there is no limitation on the correspondence between the at least one CORESET and the multiple symbol sets in the present disclosure.

It should be understood that, in the present disclosure, the slot distribution of the multiple symbol sets and the corresponding relationship between the symbol sets and the CORESET can include but is not limited to the following implementations.

Figure 5:
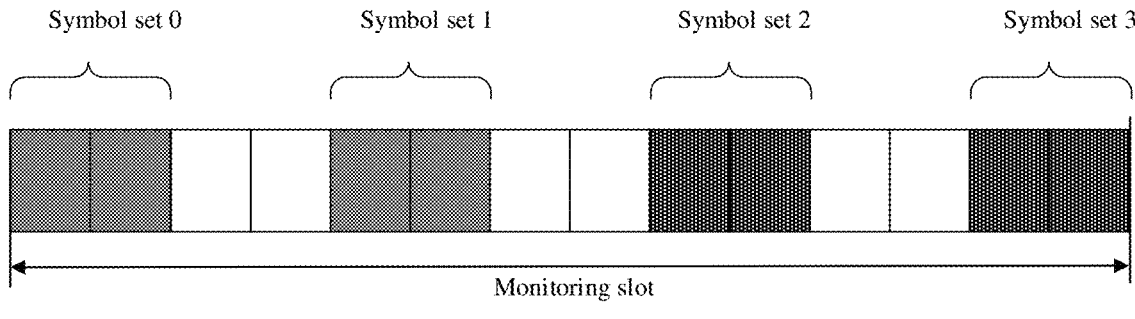
FIG. 5 is a schematic diagram of distribution of symbol sets of a CORESET provided by an embodiment of the present disclosure.

Implementation 1: the multiple symbol sets can be located in one monitoring slot of the PDCCH, and the multiple symbol sets correspond to one CORESET, as shown in FIG. 5 where the symbol sets 0-3 are all in one monitoring slot.

Figure 6:
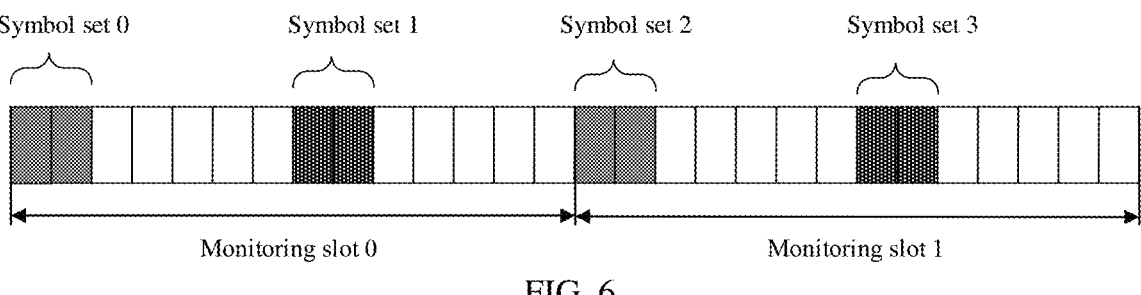
FIG. 6 is a schematic diagram of another distribution of symbol sets of a CORESET provided by an embodiment of the present disclosure.

Implementation 2: at least two symbol sets in the above multiple symbol sets are in different monitoring slots of the PDCCH, and the multiple symbol sets correspond to one CORESET, as shown in FIG. 6 where symbol sets 0 and 1 are in monitoring slot 0, and symbol set 2 and symbol set 3 are in monitoring slot 1.

Figure 7:
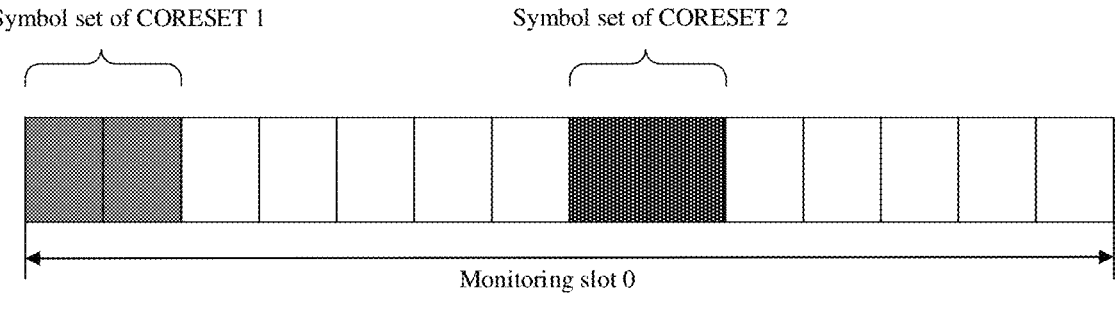
FIG. 7 is a schematic diagram of still another distribution of symbol sets of a CORESET provided by an embodiment of the present disclosure.

Implementation 3: at least two symbol sets of the above multiple symbol sets belong to different CORESETs, as shown in FIG. 7.

Optionally, at least two symbol sets in the above multiple symbol sets correspond to different frequency-domain positions. Alternatively, the frequency-domain positions corresponding to the multiple symbol sets are the same, that is, the multiple symbol sets correspond to the same frequency-domain position.

Optionally, in the case where at least two symbol sets in the multiple symbol sets correspond to the same frequency-domain position, the configuration information of the PDCCH search space is improved, that is, the frequency-domain configuration of one CORESET in the current search space is fixed, and different symbol sets of one CORESET correspond to the same frequency-domain position. In the case where at least two symbol sets in the multiple symbol sets correspond to different frequency-domain positions, the configuration information of the PDCCH search space includes an ID of a CORESET and frequency hopping information of the CORESET.

Optionally, the frequency hopping information of the CORESET includes, but is not limited to, the following information: a starting position of the CORESET in the frequency domain, and a frequency domain offset relative to the starting position. Alternatively, the frequency hopping information of the CORESET includes: a frequency domain offset relative to a starting position.

Optionally, the manner in which the terminal device bundles the multiple symbol sets of at least one CORESET according to the configuration information may include but is not limited to the following: the terminal device may bundle the multiple symbol sets of at least one CORESET according to only the configuration information, or may bundle the multiple symbol sets of at least one CORESET according to the configuration information in combination with indication information. The indication information is used to indicate the number M of the symbol sets that need to be bundled in one bundling, M being an integer greater than 1.

It should be understood that the bundling in the present disclosure may also be referred to as binding or merging, which is not limited in the present disclosure.

To sum up, in the present disclosure, the terminal device can bundle multiple symbol sets of at least one CORESET, so as to realize a higher aggregation level of the PDCCH, and realize enhanced coverage of the PDCCH. In addition, one CORESET can correspond to multiple frequency domain resources, and when the symbol sets of the CORE-SET are bound, the frequency hopping effect can be achieved, so that frequency domain diversity gain can be obtained, and the enhanced coverage of the PDCCH can be further implemented.

In the following, three implementations of slot distribution of multiple symbol sets and the correspondence between the symbol sets and the CORESET will be elaborated through Embodiment 2 to Embodiment 4.

Embodiment 2

Optionally, as described above, the multiple symbol sets are in one monitoring slot of the PDCCH, and the multiple symbol sets correspond to one CORESET.

Optionally, the configuration information of the PDCCH search space includes: the number N of symbol sets of one CORESET in one monitoring slot of the PDCCH, N being an integer greater than 1.

Optionally, based on the configuration information of the search space, the terminal device may bind the multiple symbol sets in the manners including but not limited to the following:

Implementation 1: the multiple symbol sets are N symbol sets of one CORESET, that is, the terminal device binds all the symbol sets of one CORESET within one monitoring slot.

Exemplarily, referring to FIG. 5, 4 symbol sets of the CORESET are configured in one PDCCH monitoring slot, that is, monitoringSymbolsWithinSlot indicates positions of 4 starting symbols, and a symbol set includes 2 symbols. According to the implementation 1, the terminal device can bundle the 4 symbol sets in the one monitoring slot.

Implementation 2: the terminal device obtains indication information from the network device, and the indication information is used to indicate the number M of symbol sets to be bundled for one bundling, where M is an integer greater than 1. Then, the terminal device bundles the multiple symbol sets according to the number M of symbol sets to be bundled for one bundling and the number N of symbol sets of one CORESET in one monitoring slot of the PDCCH.

Optionally, if N is an integer multiple of M, the M continuous symbol sets of one CORESET in one monitoring slot of the PDCCH are bundled in sequence. If N is not an integer multiple of M, P continuous symbol sets of one CORESET in the monitoring slot of the PDCCH are bundled in sequence, where for the first $$\left\lfloor \frac{N}{M} \right\rfloor$$

bundled symbol sets of one CORESET in one monitoring slot of the PDCCH, P=M, and for the last bundled symbol set, P=N % M.

Exemplarily, with reference to FIG. 5, 4 symbol sets of a CORESET are configured in one PDCCH monitoring slot, that is, monitoringSymbolsWithinSlot indicates positions of 4 starting symbols, and a symbol set includes 2 symbols. If the network device indicates that the number of symbol sets to be bundled is 2, that is, M=2, according to the implementation 2, the terminal device can bundle symbol set 0 and symbol set 1, and bundle symbol set 2 and symbol set 3. Of course, the terminal device may also bundle symbol set 0 and symbol set 2, and bundle symbol set 1 and symbol set 3. Alternatively, the terminal device may also bundle symbol set 0 and symbol set 3, and bundle symbol set 1 and symbol set 2.

Optionally, the above indication information may be carried in high-layer signaling, but it is not limited thereto.

Optionally, the high-layer signaling may be RRC signaling or Media Access Control (MAC) Control Element (CE) signaling, etc., which is not limited in the present disclosure.

To sum up, in the present disclosure, the terminal device can bundle multiple symbol sets in one monitoring slot, so as to realize a higher aggregation level of the PDCCH, thereby realizing enhanced coverage of the PDCCH.

Embodiment 3

Optionally, as described above, at least two symbol sets of the multiple symbol sets are in different monitoring slots of the PDCCH, and the multiple symbol sets correspond to one CORESET.

Optionally, the configuration information of the PDCCH search space includes: the number L1 of monitoring slots in the detection cycle of the PDCCH, where L1 is an integer greater than 1.

Optionally, the L1 monitoring slots in the PDCCH detection cycle may be continuous or discontinuous, which is not limited in the present disclosure.

Optionally, based on the configuration information of the search space, the terminal device may bind the multiple symbol sets in the manners including but not limited to the following:

Optional manner 1: at least two symbol sets of the multiple symbol sets are in different monitoring slots of the L1 monitoring slots. The L1 monitoring slots are within the detection cycle of the PDCCH.

For example, referring to FIG. 6, two symbol sets of the CORESET are configured in one monitoring slot of the PDCCH, that is, monitoringSymbolsWithinSlot indicates the positions of two starting symbols, and each symbol set includes two symbols. The number of monitoring slots in the detection cycle of the PDCCH is 2, that is, L1=2. According to the optional manner 1, the terminal device can bundle two corresponding symbol sets, wherein symbol set 0 corresponds to symbol set 2, symbol set 1 corresponds to symbol set 3, and the terminal device can bundle symbol set 0 and symbol set 2, and/or bundle symbol set 1 and symbol set 3.

Optional manner 2: the terminal device obtains indication information from the network device, and the indication information is used to indicate the number M of symbol sets to be bundled for one bundling, where M is an integer greater than 1. Then, the terminal device bundles multiple symbol sets according to the number M of symbol sets to be bundled for one bundling and the number L1 of monitoring slots in the PDCCH detection cycle.

For example, referring to FIG. 6, two symbol sets of the CORESET are configured in one monitoring slot of the PDCCH, that is, monitoringSymbolsWithinSlot indicates the positions of two starting symbols, and each symbol set includes two symbols. The number of monitoring slots in the detection cycle of the PDCCH is 2, that is, L1=2. If the network device indicates that the number of symbol sets to be bundled for one bundling is 2, that is, M=2, the terminal device can bundle symbol set 0 and symbol set 2, and/or bundle symbol set 1 and symbol set 3.

Optionally, the configuration information of the PDCCH search space includes: the number L2 of continuous monitoring slots in the detection cycle of the PDCCH, where L2 is an integer greater than 1.

Optionally, based on the configuration information of the search space, the terminal device may bind the multiple symbol sets in the manners including but not limited to the following:

Optional manner 1: at least two symbol sets of the multiple symbol sets are in different monitoring slots of the L2 continuous monitoring slots. The L2 continuous monitoring slots are within the detection cycle of the PDCCH.

Optional manner 2: the terminal device obtains indication information from the network device, and the indication information is used to indicate the number M of symbol sets to be bundled in one bundling, where M is an integer greater than 1. Then, the terminal device bundles multiple symbol sets according to the number M of symbol sets to be bundled in one bundling and the number L2 of continuous monitoring slots in the PDCCH detection cycle.

Optionally, the above indication information may be carried in high-layer signaling, but it is not limited thereto.

Optionally, the high-level signaling may be RRC signaling or MAC CE signaling, which is not limited in the present disclosure.

To sum up, in the present disclosure, the terminal device can bundle multiple symbol sets in different monitoring slots, so as to realize a higher aggregation level of the PDCCH, thereby realizing enhanced coverage of the PDCCH.

Embodiment 4

It should be understood that in Embodiments 2 and 3, only one CORESET is included in the configuration of the search space. In order to bind symbols more flexibly, in the present disclosure, it is allowed to bind symbol sets of different CORESETs.

Optionally, the configuration information of the search space of the PDCCH includes time-frequency domain resource information of the different CORESETs. For example, the configuration information includes a plurality of CORESET IDs, that is, one search space is configured with a plurality of CORESETs.

Optionally, the multiple symbol sets may be in one monitoring slot of the PDCCH, or at least two symbol sets of the multiple symbol sets are in different monitoring slots of the PDCCH.

Optionally, if the multiple symbol sets can be in one monitoring slot of the PDCCH, the configuration information can also indicate the position of the start symbol of each CORESET in the monitoring slot for different CORESETs.

Figure 8:
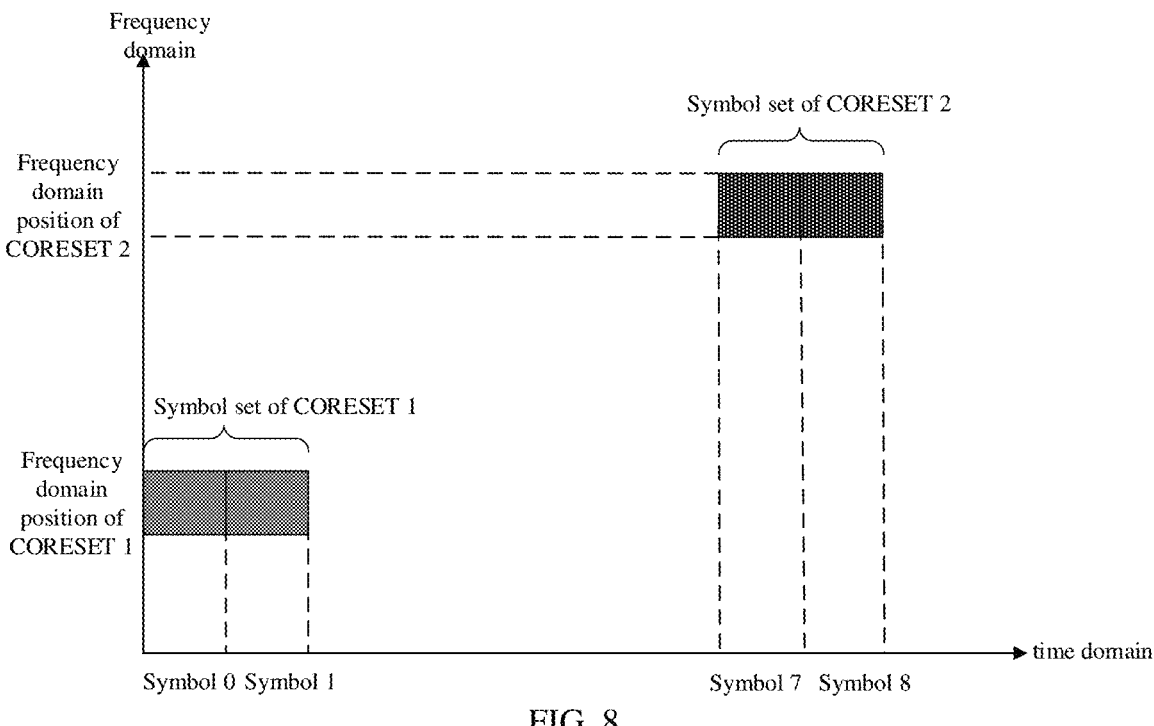
FIG. 8 is a schematic diagram of distribution of symbol sets of different CORESETs provided by an embodiment of the present disclosure.

Optionally, the time domain positions of the different CORESETs may be different. As shown in FIG. 8, the time domain positions of CORESET 1 are symbol 0 and symbol 1, and the time domain positions of CORESET 2 are symbol 7 and symbol 8.

Optionally, the different CORESETs may have different frequency domain positions. As shown in FIG. 8, the frequency domain positions of CORESET 1 and CORESET 2 are different.

Optionally, the number of symbols included in the symbol sets of different CORESETs may be the same or different.

To sum up, in the present disclosure, the terminal device can bundle multiple symbol sets in different CORESETs, so as to realize a higher aggregation level of the PDCCH, thereby realizing enhanced coverage of the PDCCH. In addition, different CORESETs can be configured with different frequency domain resources, and when they are bound, the frequency hopping effect can be achieved, so that frequency domain diversity gain can be obtained, and the enhanced coverage of PDCCH can be further realized.

Embodiment 5

In Embodiments 1 to 4, multiple symbol sets of the CORESET(s) are bundled. However, in this embodiment, the method is to directly expand the duration of the CORESET, that is, the number of symbols included.

Optionally, the number of symbols of the CORESET can be configured to be greater than 3 symbols, as follows:

Because in the PDCCH monitoring slot, in order not to affect the Physical Downlink Shared Channel (PDSCH) scheduling, the symbol positions of the PDCCH are often subject to certain restrictions, and the symbols included in the CORESET in the related art must be continuous. If the number of expanded symbols must still be continuous, it will affect the transmission of other channels or signals in the slot, such as a PDSCH and a Demodulation Reference Signal (DMRS). In this embodiment, the symbols included in the CORESET are allowed to be discontinuous within the slot, that is, the symbol set including discontinuous symbols can exist.

Optionally, the discontinuous symbols may be in one or more monitoring slots of the PDCCH.

Figure 9:
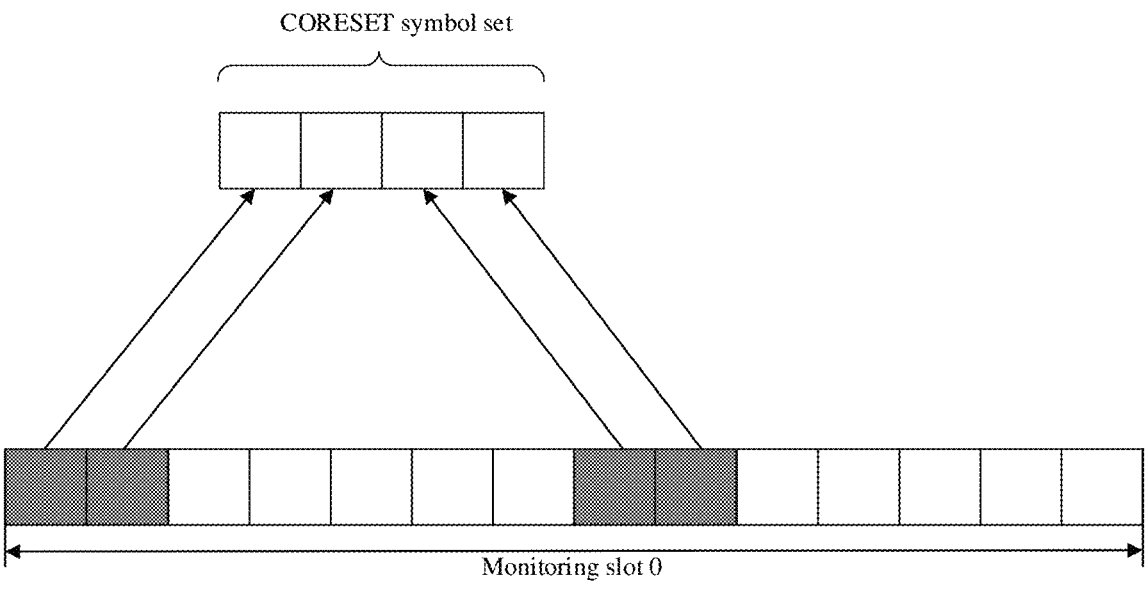
FIG. 9 is a schematic diagram of distribution of a symbol set of a CORESET provided by an embodiment of the present disclosure.

Exemplarily, as shown in FIG. 9, the number of symbols of the CORESET is 4, and the 4 intra-slot discontinuous symbols form a symbol set of the CORESET. As shown in FIG. 10, 4 inter-slot discontinuous symbols form a symbol set of the CORESET.

Optionally, in the configuration information of the search space, it needs to indicate the discontinuous symbol sets of the CORESET through indication information.

Exemplarily, the indication information is a bitmap. For example, the bitmap includes 14 bits, which are respectively used to indicate whether the 14 symbols included in a monitoring slot belong to CORESET symbols. When a certain bit is 1, it indicates that the corresponding symbol position belongs to a CORESET symbol, and when a certain bit is 0, it indicates that the corresponding symbol position does not belong to a CORESET symbol. Alternatively, when a certain bit is 0, it indicates that the corresponding symbol position belongs to a CORESET symbol, and when a certain bit is 1, it indicates that the corresponding symbol position does not belong to a CORESET symbol.

To sum up, in the present disclosure, the terminal device can extend the number of symbols in the CORESET, so as to realize a higher aggregation level of the PDCCH, thereby realizing the enhanced coverage of the PDCCH.

Embodiment 6

FIG. 11 shows a schematic block diagram of a terminal device 1100 according to an embodiment of the present disclosure. As shown in FIG. 11, the terminal device 1100 includes a communication unit 1110 and a processing unit 1120. The communication unit 1110 is configured to obtain configuration information of a PDCCH search space. The processing unit 1120 is configured to bundle multiple symbol sets of at least one CORESET according to the configuration information.

Optionally, the multiple symbol sets are in one monitoring slot of the PDCCH, and the multiple symbol sets correspond to one CORESET.

Optionally, the configuration information includes: the number N of symbol sets of one CORESET in one monitoring slot of the PDCCH, where N is an integer greater than 1. Correspondingly, the processing unit 1120 is specifically configured to: bundle the multiple symbol sets according to the number N of symbol sets of one CORESET in one monitoring slot of the PDCCH.

Optionally, the multiple symbol sets are N symbol sets of one CORESET.

Optionally, the communication unit 1110 is further configured to obtain indication information, where the indication information is used to indicate the number M of symbol sets that are to be bundled in one bundling, where M is an integer greater than 1. Correspondingly, the processing unit 1120 is specifically configured to: bundle the multiple symbol sets according to the number N of symbol sets of one CORESET within one monitoring slot of the PDCCH and the number M of symbol sets to be bundled in one bundling.

Optionally, at least two symbol sets of the multiple symbol sets are in different monitoring slots of the PDCCH, and the multiple symbol sets correspond to one CORESET.

Optionally, the configuration information includes: the number L1 of monitoring slots in a detection cycle of the PDCCH, where L1 is an integer greater than 1. Correspondingly, the processing unit 1120 is specifically configured to: bundle the multiple symbol sets according to the number L1 of monitoring slots in the PDCCH detection cycle.

Optionally, at least two symbol sets of the multiple symbol sets are in different monitoring slots of the L1 monitoring slots. The L1 monitoring slots are within the detection cycle of the PDCCH.

Optionally, the communication unit 1110 is further configured to obtain indication information, where the indication information is used to indicate the number M of symbol sets that are to be bundled in one bundling process, where M is an integer greater than 1. Correspondingly, the processing unit 1120 is specifically configured to: bundle the multiple symbol sets according to the number L1 of monitoring slots in the detection cycle of the PDCCH and the number M of symbol sets to be bundled in one bundling.

Optionally, the configuration information includes: the number L2 of continuous monitoring slots in the PDCCH detection cycle, where L2 is an integer greater than 1. Correspondingly, the processing unit 1120 is specifically configured to: bundle the multiple symbol sets according to the number L2 of continuous monitoring slots in the PDCCH detection cycle.

Optionally, at least two symbol sets of the multiple symbol sets are in different monitoring slots of the L2 continuous monitoring slots. The L2 continuous monitoring slots are within the detection cycle of the PDCCH.

Optionally, the communication unit 1110 is further configured to obtain indication information, where the indication information is used to indicate the number M of symbol sets that are to be bundled in one bundling, where M is an integer greater than 1. Correspondingly, the processing unit 1120 is specifically configured to: bundle the multiple symbol sets according to the number L2 of continuous monitoring slots in the PDCCH detection cycle and the number M of symbol sets to be bundled in one bundling.

Optionally, the indication information is carried in high-layer signaling.

Optionally, at least two symbol sets of the multiple symbol sets correspond to different frequency domain positions.

Optionally, at least two symbol sets of the multiple symbol sets belong to different CORESETs.

Optionally, the configuration information includes: time-frequency domain resource information of different CORESETs.

Optionally, the multiple symbol sets may be in one monitoring slot of the PDCCH, or at least two symbol sets of the multiple symbol sets are in different monitoring slots of the PDCCH.

Optionally, in some embodiments, the communication unit may be a communication interface or a transceiver, or an input/output interface of a communication chip or a system-on-chip. The processing unit may be one or more processors.

It should be understood that the terminal device 1100 according to the embodiment of the present disclosure may correspond to the terminal device in the method embodiments of Embodiments 1 to 4 of the present disclosure, and the above-mentioned and other operations and/or functions of the units in the terminal device 1100 are respectively for implementing the corresponding processes of the terminal device in the method embodiments of the foregoing Embodiments 1 to 4, which are not repeated here for the sake of brevity.

Embodiment 7

FIG. 12 shows a schematic block diagram of a terminal device 1200 according to an embodiment of the present disclosure. As shown in FIG. 12, the terminal device 1200 includes a communication unit 1210, configured to obtain indication information. The indication information is used to indicate a symbol set of a CORESET, and the symbol set includes discontinuous symbols.

Optionally, the discontinuous symbols may be in one or more monitoring slots of a PDCCH.

Optionally, the indication information is a bitmap. Each bit in the bitmap indicates whether each symbol in one or more monitoring slots belongs to a CORESET symbol.

Optionally, the indication information is carried in configuration information of a search space of a PDCCH.

Optionally, in some embodiments, the communication unit may be a communication interface or a transceiver, or an input-output interface of a communication chip or a system-on-chip.

It should be understood that the terminal device 1200 according to the embodiment of the present disclosure may correspond to the terminal device in the method embodiments of Embodiment 5 of the present disclosure, and the above-mentioned and other operations and/or functions of the units in the terminal device 1200 are respectively for implementing the corresponding processes of the terminal device in the method embodiments of the foregoing Embodiment 5, which are not repeated here for the sake of brevity.

Embodiment 8

Figures 13, 14, 15:
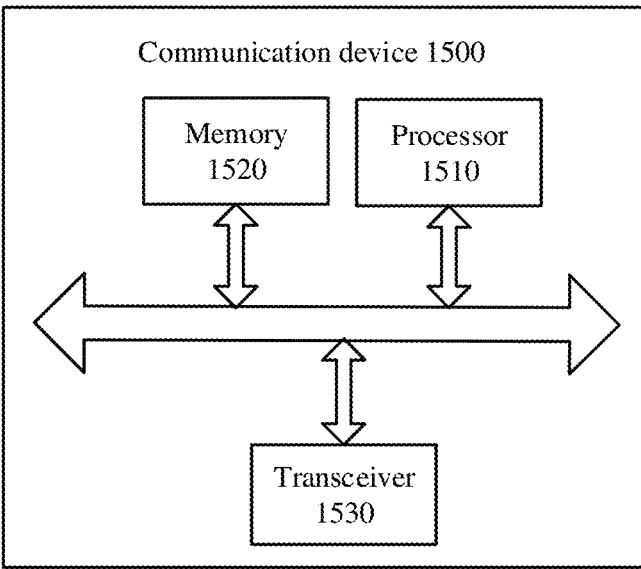
FIG. 13 shows a schematic block diagram of a network device 1300 according to an embodiment of the present disclosure.
FIG. 14 shows a schematic block diagram of a network device 1400 according to an embodiment of the present disclosure.
FIG. 15 is a schematic structural diagram of a communication device 1500 provided by an embodiment of the present disclosure.

FIG. 13 shows a schematic block diagram of a network device 1300 according to an embodiment of the present disclosure. As shown in FIG. 13, the network device 1300 includes a communication unit 1310 configured to send configuration information of a search space of a PDCCH to a terminal device. The configuration information is used to bundle multiple symbol sets of at least one CORESET.

Optionally, the multiple symbol sets are in one monitoring slot of the PDCCH, and the multiple symbol sets correspond to one CORESET.

Optionally, the configuration information includes: the number N of symbol sets of one CORESET in one monitoring slot of the PDCCH, N being an integer greater than 1.

Optionally, the multiple symbol sets are N symbol sets of one CORESET.

Optionally, at least two symbol sets of the multiple symbol sets are in different monitoring slots of the PDCCH, and the multiple symbol sets correspond to one CORESET.

Optionally, the configuration information includes: the number L1 of monitoring slots in a detection cycle of the PDCCH, where L1 is an integer greater than 1.

Optionally, at least two symbol sets of the multiple symbol sets are in different monitoring slots of the L1 monitoring slots. The L1 monitoring slots are within the detection cycle of the PDCCH.

Optionally, the configuration information includes: the number L2 of continuous monitoring slots in the detection cycle of the PDCCH, where L2 is an integer greater than 1.

Optionally, at least two symbol sets of the multiple symbol sets are in different monitoring slots of the L2 continuous monitoring slots. The L2 continuous monitoring slots are within the detection cycle of the PDCCH.

Optionally, the communication unit 1310 is further configured to: send indication information to the terminal device, where the indication information is used to indicate the number M of symbol sets to be bundled in one bundling, M being an integer greater than 1.

Optionally, the indication information is carried in high-layer signaling.

Optionally, at least two symbol sets of the multiple symbol sets correspond to different frequency domain positions.

Optionally, at least two symbol sets of the multiple symbol sets belong to different CORESETs.

Optionally, the configuration information includes: time-frequency domain resource information of different CORE-SETs.

Optionally, the multiple symbol sets are in one monitoring slot of the PDCCH, or at least two symbol sets of the multiple symbol sets are in different monitoring slots of the PDCCH.

Optionally, in some embodiments, the communication unit may be a communication interface or a transceiver, or an input-output interface of a communication chip or a system-on-chip.

It should be understood that the network device 1300 according to the embodiment of the present disclosure may correspond to the network device in the method embodiments of Embodiments 1 to 4 of the present disclosure, and the above-mentioned and other operations and/or functions of the units in the network device 1300 are respectively for implementing the corresponding processes of the network device in the method embodiments of the foregoing Embodiments 1 to 4, which are not repeated here for the sake of brevity.

Embodiment 9

FIG. 14 shows a schematic block diagram of a network device 1400 according to an embodiment of the present disclosure. As shown in FIG. 14, the network device 1400 includes a communication unit 1410 configured to send indication information to a terminal device. The indication information is used to indicate a symbol set of a CORESET, and the symbol set includes discontinuous symbols.

Optionally, the discontinuous symbols may be in one or more monitoring slots of a PDCCH.

Optionally, the indication information is a bitmap. Each bit in the bitmap indicates whether each symbol in one or more monitoring slots belongs to a CORESET symbol.

Optionally, the indication information is carried in configuration information of a search space of a PDCCH.

Optionally, in some embodiments, the communication unit may be a communication interface or a transceiver, or an input-output interface of a communication chip or a system-on-chip.

It should be understood that the network device 1400 according to the embodiment of the present disclosure may correspond to the network device in the method embodiment of Embodiment 5 of the present disclosure, and the above-mentioned and other operations and/or functions of the units in the network device 1400 are respectively for implementing the corresponding processes of the network device in the method embodiment of the foregoing Embodiment 5, which are not repeated here for the sake of brevity.

Embodiment 10

FIG. 15 is a schematic structural diagram of a communication device 1500 according to an embodiment of the present disclosure. The communication device 1500 shown in FIG. 15 includes a processor 1510. The processor 1510 can call and execute a computer program from a memory to implement the methods in the embodiments of the present disclosure.

Optionally, as shown in FIG. 15, the communication device 1500 can further include a memory 1520. The processor 1510 can invoke and run the computer program from the memory 1520 to carry out the methods in the embodiments of the present disclosure.

The memory 1520 can be a separate device independent of the processor 1510, or can be integrated in the processor 1510.

Optionally, as shown in FIG. 15, the communication device 1500 can further include a transceiver 1530, and the processor 1510 can control the transceiver 1530 to communicate with other devices, and specifically, to transmit information or data to other devices, or to receive information or data transmitted from other devices.

The transceiver 1530 can include a transmitter and a receiver. The transceiver 1530 can further include an antenna, and the number of the antennas can be one or more.

Optionally, the communication device 1500 can specifically be a network device in the embodiments of the present disclosure, and the communication device 1500 can carry out the corresponding processes which are implemented by the network device in the methods of the embodiments of the present disclosure, which will not be repeated here for the sake of brevity.

Optionally, the communication device 1500 can specifically be the terminal device in the embodiments of the present disclosure, and the communication device 1500 can carry out the corresponding processes which are implemented by the terminal device in the methods of the embodiments of the present disclosure, which will not be repeated here for the sake of brevity.

Embodiment 11

Figures 16, 17:
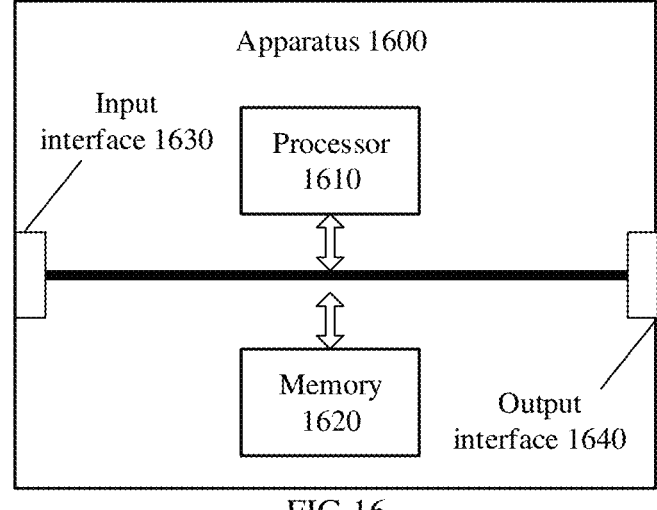
FIG. 16 is a schematic structural diagram of an apparatus according to an embodiment of the present disclosure.
FIG. 17 is a schematic block diagram of a communication system 1700 provided by an embodiment of the present disclosure.

FIG. 16 is a schematic structural diagram of an apparatus according to an embodiment of the present disclosure. The apparatus 1600 shown in FIG. 16 includes a processor 1610 which can call and run a computer program from a memory to carry out the methods in the embodiments of the present disclosure.

Optionally, as shown in FIG. 16, the apparatus 1600 can further include a memory 1620. The processor 1610 can call and run the computer program from the memory 1620 to carry out the methods in the embodiments of the present disclosure.

The memory 1620 can be a separate device independent of the processor 1610, or can be integrated in the processor 1610.

Optionally, the apparatus 1600 can further include an input interface 1630. The processor 1610 can control the input interface 1630 to communicate with other devices or chips, and specifically, to obtain information or data transmitted by other devices or chips.

Optionally, the apparatus 1600 can further include an output interface 1640. The processor 1610 can control the output interface 1640 to communicate with other devices or chips, and specifically, to output information or data to other devices or chips.

Optionally, the apparatus can be applied to the network device in the embodiments of the present disclosure, and the apparatus can carry out the corresponding processes which are implemented by the network device in the methods of the embodiments of the present disclosure, which will not be repeated here for the sake of brevity.

Optionally, the apparatus can be applied to the terminal device in the embodiments of the present disclosure, and the apparatus can carry out the corresponding processes which are implemented by the terminal device in the methods of the embodiments of the present disclosure, which will not be repeated here for the sake of brevity.

Optionally, the apparatus mentioned in the embodiments of the present disclosure may also be a chip. For example, it may be a system level chip, a system chip, a chip system, a system-on-a-chip, or the like.

Embodiment 12

FIG. 17 is a schematic block diagram of a communication system 1700 according to an embodiment of the present disclosure. As shown in FIG. 17, the communication system 1700 includes a terminal device 1710 and a network device 1720.

The terminal device 1710 can be configured to implement the corresponding functions implemented by the terminal device in the above methods, and the network device 1720 can be configured to implement the corresponding functions implemented by the network device or base station in the above methods, which will not be repeated here for the sake of brevity.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure also provides a computer-readable storage medium for storing a computer program.

Optionally, the computer-readable storage medium can be applied to the network device or base station in the embodiments of the present disclosure, and the computer program causes a computer to perform the corresponding processes which are implemented by the network device or base station in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

An embodiment of the present disclosure also provides a computer program product including computer program instructions.

Optionally, the computer program product can be applied to the network device or base station in the embodiments of the present disclosure, and the computer program instructions cause a computer to perform the corresponding processes implemented by the network device or base station in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

An embodiment of the present disclosure also provides a computer program.

Optionally, the computer program can be applied to the network device or base station in the embodiments of the present disclosure, and when running on a computer, the computer program causes the computer to perform the corresponding process implemented by the network device or base station in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

To sum up, the present disclosure adopts the method of bundling multiple symbol sets of the CORESET, or expanding the number of symbols of the CORESET, so as to realize a higher aggregation level of the PDCCH and enhanced coverage of the PDCCH.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed over multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. With such understanding, the technical solution of the present disclosure essentially, a part thereof that contributes to the prior art, or a part of the technical solution can be embodied in the form of a software product, and the computer software product is stored in a storage medium and includes instructions which cause a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A wireless communication method, comprising:
   obtaining configuration information of a search space of a physical downlink control channel, PDCCH; and
   bundling multiple symbol sets of at least one Control Resource Set, CORESET, according to the configuration information, wherein at least two symbol sets of the multiple symbol sets belong to different CORESETs, and
   wherein the configuration information comprises time-frequency domain resource information of different CORESETs.

2. The method according to claim 1, wherein the multiple symbol sets are in one monitoring slot of the PDCCH.

3. A wireless communication method, comprising:
   sending configuration information of a search space of a PDCCH to a terminal device;
   wherein the configuration information is used for bundling multiple symbol sets of at least one CORESET, and at least two symbol sets of the multiple symbol sets belong to different CORESETs, and
   wherein the configuration information comprises time-frequency domain resource information of different CORESETs.

4. The method according to claim 3, wherein the multiple symbol sets are in one monitoring slot of the PDCCH.

5. A terminal device, comprising:
   a processor;
   a memory for storing instructions executable by the processor; and
   a transceiver,
   wherein the transceiver is configured to obtain configuration information of a search space of a PDCCH; and
   the processor is configured to bundle multiple symbol sets of at least one CORESET according to the configuration information, wherein at least two symbol sets of the multiple symbol sets belong to different CORESETs, and
   wherein the configuration information comprises time-frequency domain resource information of different CORESETs.

6. The terminal device according to claim 5, wherein the multiple symbol sets are in one monitoring slot of the PDCCH.

7. A network device, comprising:

a processor;

a memory for storing instructions executable by the processor; and a transceiver, wherein the transceiver is configured to send configuration information of a search space of a PDCCH to a terminal device;

wherein the configuration information is used for bundling multiple symbol sets of at least one CORESET, and at least two symbol sets of the multiple symbol sets belong to different CORESETs, and wherein the configuration information comprises time-frequency domain resource information of different CORESETs.

8. The network device according to claim 7, wherein the multiple symbol sets are in one monitoring slot of the PDCCH.

\* \* \* \* \*